United States Patent [19]

Smolik

[11] 4,330,862
[45] May 18, 1982

[54] SIGNAL CHARACTERISTIC STATE DETECTOR USING INTERVAL-COUNT PROCESSING METHOD

[75] Inventor: Kenneth F. Smolik, Morristown, N.J.

[73] Assignee: Bell Telephone Laboratories, Incorporated, Murray Hill, N.J.

[21] Appl. No.: 167,383

[22] Filed: Jul. 9, 1980

[51] Int. Cl.³ ....................... H04C 7/00; H04C 27/22
[52] U.S. Cl. ..................................... 375/75; 375/114
[58] Field of Search ................... 375/75, 84, 114, 118, 375/119, 120

[56] References Cited

U.S. PATENT DOCUMENTS

| | | | |
|---|---|---|---|
| 4,010,323 | 3/1977 | Peck | 375/84 |
| 4,029,900 | 6/1977 | Addeo | 375/114 |

OTHER PUBLICATIONS

1978 National Telecommunications Conference Record, Dec. 3-6, 1978, pp. 30.2.1-30.2.5, R. Matyas et al., "Digital Implementation of an FFSK Modem".

*Primary Examiner*—Howard Britton
*Attorney, Agent, or Firm*—C. S. Phelan

[57] ABSTRACT

Received baseband data signals, in the form of signals having at least one level transition per symbol indicative of symbol information state, are sampled (17) at a rate much higher than the symbol rate. The samples are used to control the direction of counting (20) of local clock (12) signals recurring at that higher rate during symbol subintervals of predetermined duration. Counts produced during adjacent subintervals are processed (FIGS. 4 and 5) to produce several different results such as recognition of the start of an asynchronously occurring data message, acquisition and tracking of symbol phase in the message, and detection of symbol information states.

19 Claims, 15 Drawing Figures

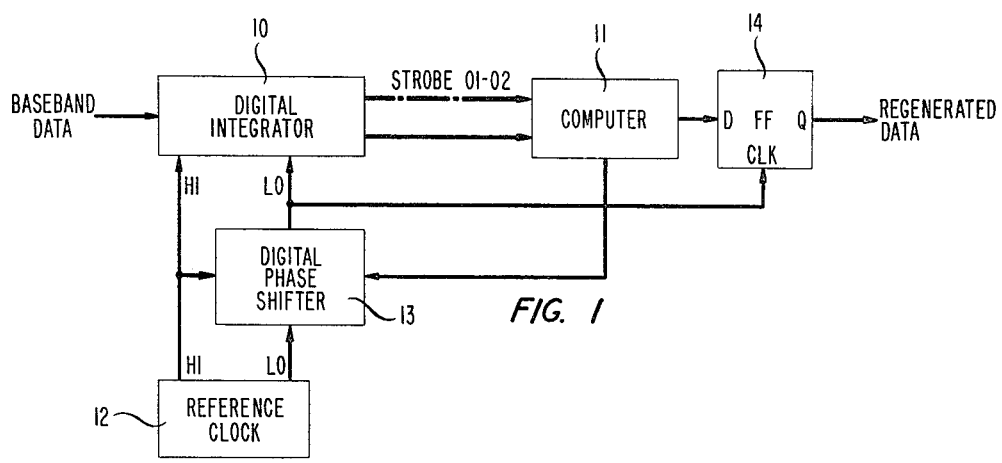
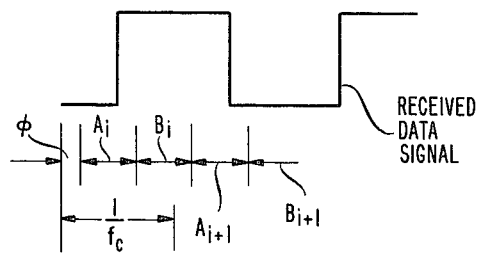
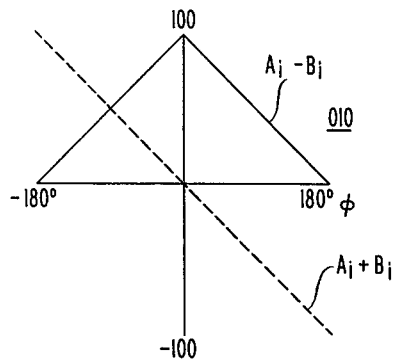
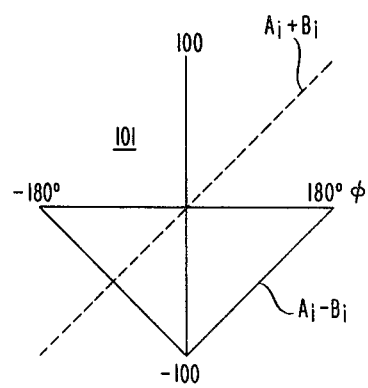

SIGNAL CHARACTERISTIC STATE DETECTOR USING INTERVAL-COUNT PROCESSING METHOD

BACKGROUND OF THE INVENTION

This invention relates to a method and apparatus for detecting a predetermined characteristic of data signals and, particularly, for regenerating such signals in mobile radiotelephone systems.

Numerous schemes are known in the art for regenerating received baseband data in order to make the binary coded information contained therein available for use in equipment that need not operate in time synchronism with the received data. However, such schemes are usually characterized by various shortcomings, at least in regard to mobile radiotelephone systems, in that the circuits are either highly complex and, thus, too expensive for employment in individual mobile units; or the circuit operation is inadequate in an error rate sense for coping with the vagaries of the multipath, Rayleigh fading environment in the near microwave region of the frequency spectrum.

In a U.S. Pat. No. 4,010,323 to R. J. Peck, a timing recovery circuit, apparently for a fixed facility system, samples data at a rate higher than the bit rate and applies the samples to a shaft register. The phases between samples separated by an integral number of carrier wave half-cycles along the shift register are compared in order to derive data signal phase. The timing information thus derived is then utilized in circuits not disclosed.

A further U.S. Pat. No. 4,029,900 to E. J. Addeo illustrates one example of circuits known in the art for recovering timing from Manchester coded signals in a mobile radiotelephone environment. A large portion of the circuit operates in an analog signal mode and is, therefore, subject to soft failure in that, e.g., circuit element aging can cause filter mistuning with consequent degradation in operation. Also, it has been found that sometimes unresolved phase ambiguities can occur during certain data sequences.

In a paper entitled "Individual Implementation of an FFSK Modem," pp. 30.2.1–30.2.5, in the *Conference Record of the 1978 National Telecommunications Conference*, R. Matyas et al. describe a modem for use in mobile radio applications. A phase-comparing circuit used there is responsive to data signal level transition pulses and to a reference wave for determining whether the received signal is leading or lagging in phase. An up-/down counter averages the lead/lag outputs of the phase comparator to determine the extent of required local clock reference correction. Multiple bit intervals appear to be necessary to acquire phase. Although the system is described as operating satisfactorily in the VHF range, it has been found that such systems with heavy dependence on information transitions are subject to errors due to noise when required to operate in the near microwave range, e.g., between 800 and 900 MHz.

SUMMARY OF THE INVENTION

The foregoing difficulties of the prior art are alleviated in accordance with an embodiment of the present invention wherein binary coded words are generated to represent, for respective recurring symbol subintervals of predetermined length in received data signals, the approximate proportion of the subinterval that the information signal state is in one of the binary signal states. Those words are processed in different ways to detect the state of at least one predetermined signal characteristic.

In one embodiment wherein received signals include asynchronously occurring data messages, the subinterval word processing is used to detect the presence or absence state of a certain frequency component indicating a start of message, detect the leading or lagging phase state with respect to a local clock, and detect the binary information state of message symbols for regenerating the message.

BRIEF DESCRIPTION OF THE DRAWING

A more complete understanding of the invention and its various features, objects, and advantages may be obtained from a consideration of the appended claims and the following Detailed Description in connection with the attached drawings in which FIG. 1 is a functional block and line diagram of a data detector utilizing the invention;

FIG. 3 is a diagram of clock counting intervals illustrating an aspect of the operation of the invention;

FIGS. 6 through 15 are processed-value-versus-phase-error diagrams illustrating different phase recovery aspects of the invention.

DETAILED DESCRIPTION

Figure 2:
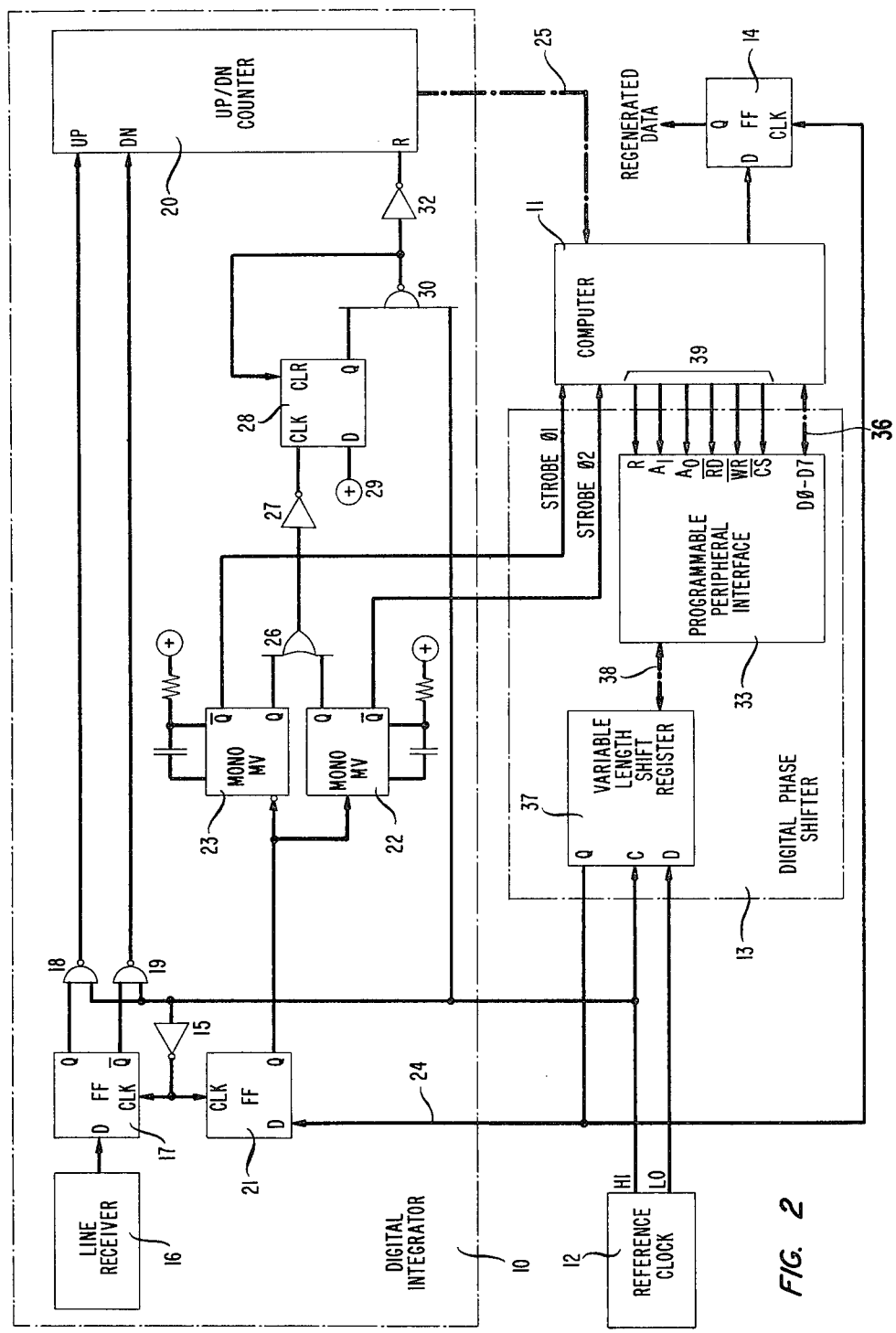
FIG. 2 is a schematic diagram of the circuits of FIG. 1.

In FIG. 1, input baseband data signals of the binary coded type, and advantageously in the so-called Manchester format, are applied to an input of a digital integrator 10. In the Manchester format, at least one signal level transition per symbol is included; and the direction of transition is indicative of the binary information state of the symbol. That is, a negative-going transition typically appears in mid-symbol time for a binary ONE, and a positive-going transition appears in mid-symbol time for a binary ZERO. In this description, the terms "bit" and "symbol" are used interchangeably with reference either to an element of coded information or to a time base subdivision of duration equal to that of such an information element.

In a mobile radiotelephone receiver application, the indicated baseband data advantageously is provided from the output of a frequency discriminator in a frequency modulation-type of receiver; and such discriminator output may include either voice or data signals. In a worst case situation, which will be considered herein, the data messages occur at unpredictable times, e.g., in short bursts of 10-kilobit-per-second data in a blanked 200-millisecond interval of a voice message. Furthermore, such received signals typically include both slow and fast fading, noise, and distortion which usually characterize the multipath transmission medium in mobile radiotelephone transmissions in, for example, at least the 800–900-MHz range of the frequency spectrum.

The output regenerated data detected by the circuit is provided from a computer 11 which is responsive to output signals from the digital integrator 10 in performing that task. That computer is advantageously the single-board computer 80/05 of the Intel Corp. and includes such elements as a microprocessor, a clock source, both permanent and temporary memory, and various additional registers and control circuits. The regenerated data is advantageously in the so-called nonreturn-to-zero format in which the binary signal level representing a binary information state prevails throughout substantially the full bit interval, and signal level transitions occur at only the points of information state changes. The regenerated data signal from computer 11, and which is synchronized to the computer's on-board clock, is sampled by a D-type flip-flop circuit 14 that is clocked by a phase-adjusted version of a local bit rate clock. That sampling advantageously eliminates phase jitter in the computer output and brings the output data into synchronism with that clock.

A reference clock 12 in one embodiment includes, advantageously, an oscillator driving high-speed decade counters for providing high- and low-frequency clock outputs. For an illustrative case dealing with 10-kilobit-per-second data, the high-frequency clock is at a rate of 1 MHz, and the low-frequency clock sometimes called the bit rate clock, occurs at a 10-KHz rate. These high and low clock signals are applied to a digital phase shifter 13, and the high clock signals are also applied directly to the digital integrator 10. The phase of the low clock signals is adjusted by the digital phase shifter 13, in response to phase control signals from the computer 11, prior to application of those low clock signals to the digital integrator 10 and flip-flop circuit 14.

Integrator 10 translates the baseband data into a sequence of data symbol subinterval digital words for application to the computer 11 in synchronism with reference clock 12. Integrator 10 also provides phase-corrected (with respect to received data signal phase) clock signals to computer 11 in the form of separate signals strobe φ1 and strobe φ2. These strobe signals are short pulses occurring respectively at the leading and trailing edges of each low-clock, signal-train, positive-going, pulse portion.

FIG. 2 illustrates the same system shown in FIG. 1 but in greater detail with respect to the digital integrator 10 and the digital phase shifter 13. In the integrator 10, received baseband data is coupled through a line receiver 16 to be sampled by a D-type flip-flop, or bistable multivibrator, circuit 17. The flip-flop circuit 17 is clocked by the reference clock high-frequency output, i.e., the 1-MHz clock signal, without phase correction thereof, but after coupling through an inverter 15. That high clock signal, prior to inversion, is applied to actuate the one of two NAND-gates 18 and 19 enabled by one of the Q and Q̄ outputs of the flip-flop circuit 17. Only one of those outputs is positive-going at any given time, so only one of the gates 18 and 19 can be enabled at a time. This operation steers the clock signals through one or the other of the gates, depending on the state of the flip-flop circuit 17.

Outputs of the gates 18 and 19 are applied to the respective up and down counting control input connections for an up/down counter 20. Thus, there is the possibility for changing the direction of operation of the counter at the time of each of the high clock rate pulses. In addition, each pulse applied to either of these direction control inputs also acts as a clock pulse for driving the counter by one step in the corresponding direction.

The phase-corrected low-frequency (bit rate) clock on a lead 24 from the phase shifter 13 is also sampled at the high clock rate by another D flip-flop circuit 21. A Q output of that flip-flop is applied directly to the triggering input connection of a first monostable multivibrator 22 and is further applied through an inverting input connection to a second monostable multivibrator 23. The Q output of whichever one of the multivibrators is triggered by a new output from flip-flop circuit 21 comprises a narrow positive-going pulse which is coupled through a logical OR-gate 26 and an inverter 27 for providing a negative-going leading edge clock signal to a D flip-flop circuit 28. That pulse need be only long enough to be recognized as such for clocking circuit 28, but should not be as long as one-half of a bit period. Flip-flop circuit 28 has its data input permanently connected to a positive voltage source 29 for simulating a permanent binary ONE input.

It is thus apparent that the output of flip-flop 21 will remain in any given high or low state, regardless of the number of clock pulses applied thereto, until the signal level state from the output of phase shifter 13 changes. It is only such a change, coupled through flip-flop 21, which is capable of triggering one of the multivibrators 22 (positive-going change) or 23 (negative-going change). Thus, flip-flop circuit 28 is clocked after each signal level transition of the phase-corrected low-frequency bit rate clock. The Q output of flip-flop 28 is applied to a NAND-gate 30. That gate is thereafter actuated by the first pulse of the high-frequency clock signal from reference clock 12. When gate 30 is actuated, its low output is coupled back to clear the flip-flop 28 to the binary ZERO state where it must rest until it receives an additional datta-input-sampling clock pulse.

The Q outputs of monostable multivibrators 22 and 23 comprise the strobe φ2 and strobe φ1 signals for application to computer 11 as previously outlined. These two strobe signals enable different data input port registers of the computer to sample the bit-parallel output of counter 20 applied by way of a bus 25. Thus, for example, a positive-going, low-frequency, clock signal transition occurring in the first half of a data symbol time produces a negative-going strobe φ2 pulse for enabling the corresponding input port register in computer 11. Similarly, on a negative-going transition of the flip-flop 21 output signal, the strobe φ1 pulse enables its computer input port register to sample the counter output. These two samples for a symbol interval are hereinafter designated for convenience the A count and the B count, respectively, of a symbol interval.

The output of NAND-gate 30 is negative-going when the gate is actuated and is fed forward through an inverter 32 to a reset input connection of the counter 20 for resetting that counter to the zero count condition. That resetting happens at the end of each half-period of the phase-adjusted bit rate clock. However, one of the aforementioned strobe pulses will have caused computer 11 to sample the counter contents through an appropriate input port of the computer before that counter resetting operation takes place.

In summary, with respect to the digital integrator 10, its output is a succession of count word pairs occurring at the data bit rate and in synchronism with the local reference clock as phase-adjusted to a predetermined phase relationship with respect to the received baseband data signal. The magnitude of each count word is an indication of the proportion of the time during its corresponding symbol subinterval that the data signal is in one of the binary signal states because the counter is driven to increment when the received data signal is high, and is driven to decrement when the received data signal is low.

Digital phase shifter 13 includes a programmable peripheral interface circuit 33 such as, for example, the 8255 programmable peripheral interface circuit of the Intel Corporation. That interface circuit allows computer 11 to apply calculated phase correction signals by way of a multiconductor bus 36 from a bidirectional data port, through the interface circuit, to control the length of a variable length shift register 37 such as the 14557 variable shift register of the Motorola Corporation. Data input to shift register 37 is the uncorrected bit rate clock signal from reference clock 12, and the shift register is clocked by the uncorrected high-frequency output of reference clock 12. The output of shift register 37 is thus a high clock rate train of time-adjacent samples of the bit rate clock signal so the train has the appearance of the bit rate clock signal wave. That train is delayed by the number of stages in the shift register. That number is controllable by the aforementioned digital words from computer 11 provided by way of the interface 33 and another multiconductor bus 38. The number is stored in a data port latch register of the interface so that the computer need not maintain the control information on its bus 36 at all times.

An additional multiconductor bus 39 provides control signals from computer 11 to the peripheral interface circuit 33. These signals include a chip select signal CS for allowing the computer to enable the interface circuit 33 as distinguished from other peripheral units (not shown) with which the computer may interact. Also provided are reading and writing control signals RD and WR which determine whether the interface circuit will read information from shift register 38 into computer 11 or write information in the reverse direction. Two control inputs $A_1$ and $A_0$ provide address information from the computer to designate one of two interface circuit output ports which will be used in applications wherein, for example, the shift register 37 includes a pair of tandem-connected 14557 shift registers. A resetting signal is also supplied by way of the bus 39 to cause the interface 33 to initialize, i.e., set to zero delay, shift register 37 at the same time that circuits of computer 11 are initialized at the beginning of any period of operation.

Computer 11 is responsive to the aforementioned digital count words for processing those words with respect to numerical threshold, or decision, values. The numerical threshold values are chosen, in consideration of the particular size of data symbol subinterval chosen to provide integrator output count words, and in consideration of a predetermined arithmetic rule for combining those count words, to utilize a desired selection/discrimination characteristic to be applied with respect to the received data signals.

In the illustrative embodiment described herein, one useful subinterval is one-half of a data symbol interval. For data detection purposes, the difference between integrator output count word values for time-adjacent subintervals is compared to a threshold value related to the signal information characteristic of the received data signal for discriminating between binary ONE and ZERO bits to produce the regenerated data. In regard to applications in which the local clock signal is not in synchronism with the received data signal, a further difference is calculated between that first mentioned difference magnitude and the magnitude of the sum of the same time-adjacent words. That further difference value is compared to a second threshold value which is related to the leading/lagging phase error characteristic of the signal for discriminating between leading and lagging conditions to produce phase error correction signals for application to the phase shifter 13. In regard to applications in which data messages occur asynchronously at unpredictable times, such messages are illustratively required to include a preamble bit sequence including a predetermined characteristic frequency component. The magnitude of the difference between corresponding subinterval counts in time-adjacent data symbols is compared to a third threshold value related to a frequency band discrimination characteristic for detecting that frequency component. Comparison results are used to enable the illustrated circuits to detect the data message information that follows the preamble frequency component sequence. Also in the asynchronous message case, the sum and difference values of time-adjacent subintervals of one bit clock period are utilized to determine the magnitude and polarity of phase error for phase acquisition and tracking.

In FIG. 3, there is shown a wave diagram of an arbitrarily selected segment of a received data signal, and associated therewith are indications of various parameters to be considered in connection with an operational process for the system of FIG. 1 for regenerating data. The signal wave has two levels; and, prior to phase acquisition, any illustrated transition between those levels may be that which occurs at each mid-symbol time and has information significance (negative-going being a ONE, positive-going being a ZERO) or that sometimes occurring at the edge of a bit time and having no certain information significance. An indicated time interval, $(1/f_c)$, is a bit interval, i.e., the bit rate clock period, and is shown spanning a signal transition which is now assumed to be an information-significant transition, i.e., a ZERO. Another interval $\phi$ is an assumed arbitrary phase error between the phases of the received data and the local reference clock.

Double-headed arrows in FIG. 3 immediately below the signal wave representation indicate successive symbol subinterval counting times defined by the bit rate clock. At the end of each such subinterval, the up-/down counter 20 is read out to the computer 11 through the appropriate computer port to a corresponding register, or memory location, in computer 11. After each such read-out, the counter is reset to zero as previously outlined. The A-type subintervals, e.g., the arbitrary intervals $A_i$ and $A_{i+1}$, are intended to represent counting subintervals at corresponding times in time-adjacent bit intervals. In the illustration of FIG. 3, these A-type intervals are assumed to be located primarily in the initial halves of their respective bit intervals, i.e., ZERO and ONE intervals. The B-type subintervals, $B_i$ and $B_{i+1}$, similarly are subintervals count times located in the final halves of their respective bit intervals. Thus, similarly subscripted A- and B-type subintervals are time-adjacent subintervals primarily within the same bit time, assuming small phase error. Since subinterval counting direction in counter 20 is determined by either the high or the low received signal level, the size of the net count in any subinterval is a function of the relative sizes of the portions thereof during which the data signal is at each of the two levels.

Figure 4:
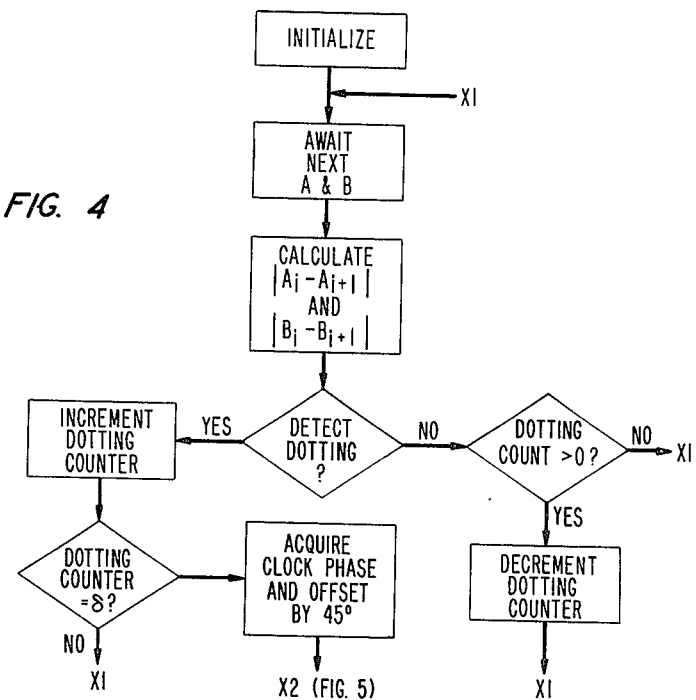
FIGS. 4 and 5 are flow diagrams of processes utilized in the system of FIG. 1.
Figure 8:
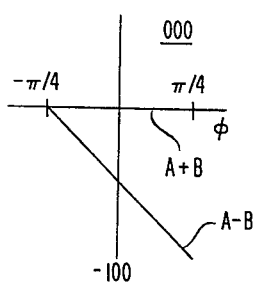
Figure 9:
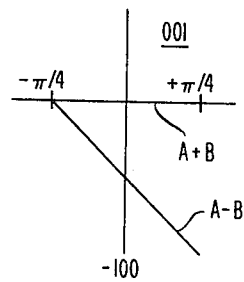
Figure 5:
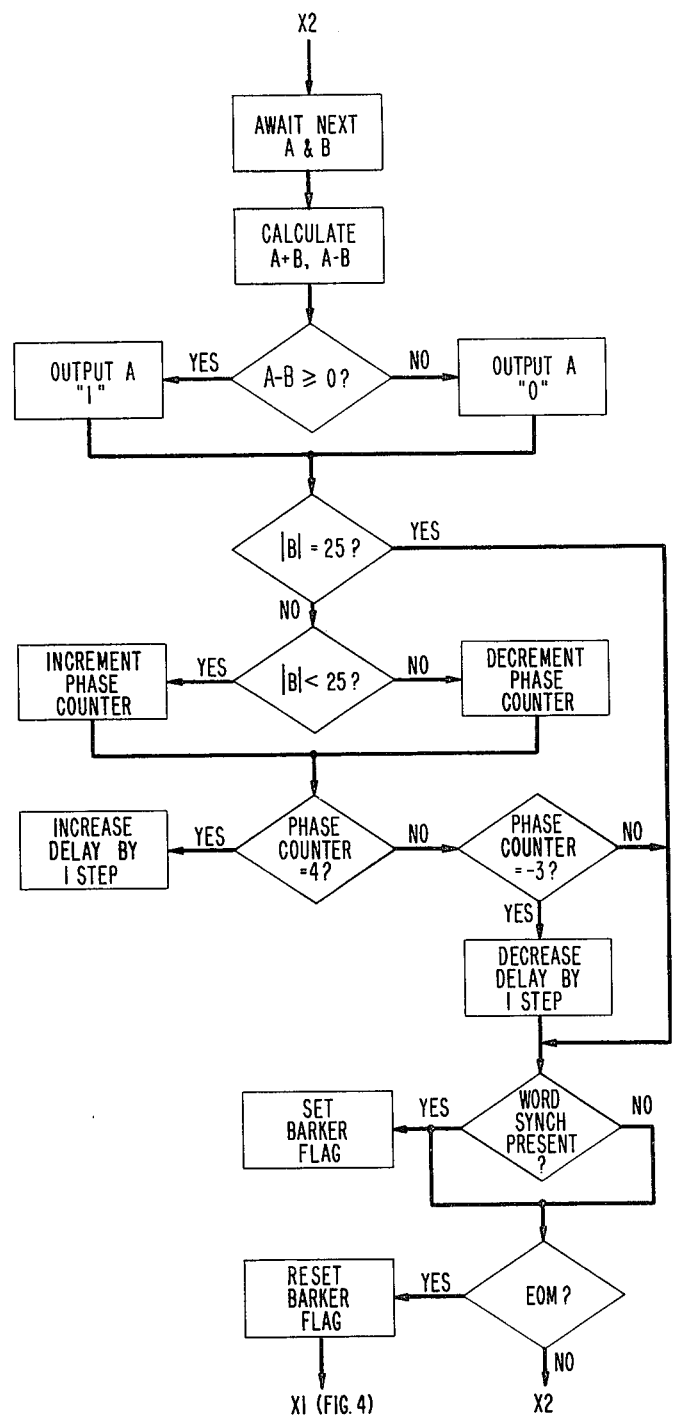
Figure 11:
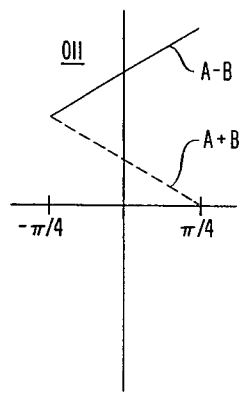
Figure 12:
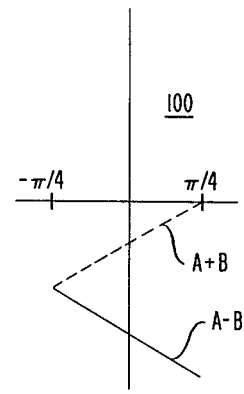
Figure 13:
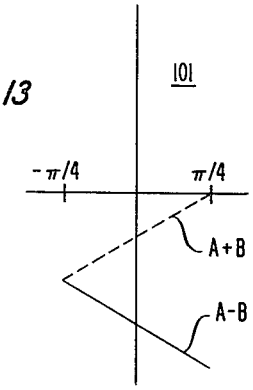
Figure 14:
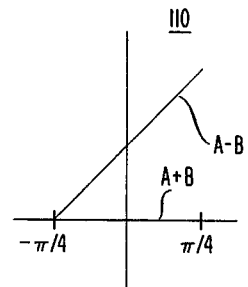
Figure 15:
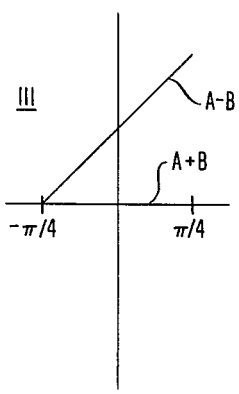

An illustrative sequence for processing subinterval count words in computer 11 for performing different functions which are useful, at least in data regeneration in the system of FIG. 1, will now be considered in connection with the process flow diagrams of FIGS. 4 and 5. The entire illustrative process of those two figures operates on the assumption that after system initialization, during which delays and computer counters are set to zero, the up/down counter 20 is continuously driven at a rate much higher than the bit rate, is essentially periodically read out at twice the data bit rate to the computer 11, and is reset after each readout. Assuming the worst case situation, in which data messages occur asynchronously and in which there is no predetermined phase relationship between the data signal time base and the reference clock 12, the FIG. 1 circuits must detect an equipment-alerting preamble, regardless of phase considerations, which indicates that a data message follows. One such preamble is a so-called dotting sequence that is a series of alternating binary ONE and ZERO bits. The circuits must also acquire data signal phase in that preamble portion and then detect message word synchronization while, at essentially the same time, tracking data information and received data signal phase. The process illustrated in FIGS. 4 and 5 depicts one embodiment of that procedure. However, some of the illustrated steps can, of course, be eliminated in applications wherein occurrence times for data messages are predetermined, and/or the bit phase of the data signal is likewise predetermined, e.g., by transmission system organization.

The description of FIGS. 4 and 5 assumes an illustrative embodiment in which a data message comprises a premable of 100 bits of dotting which, at a 10-kilobit-per-second bit rate, has the appearance of a 5-KHz signal wave because, in the Manchester coding format, such a dotting sequence has only one signal level transition per bit time. The assumed data preamble is then followed by a word-synchronizing character, such as an 11-bit Barker sequence, and then followed by the data message information text.

After initialization, the FIG. 4 process awaits reception of the next A,B pair of values. Upon the receipt in computer 11 of each strobe $\phi 1$ signal, the process recognizes that both the A subinterval and the B subinterval counts for a bit time interval have been received from counter 20. Each four successive counts, such as the four indicated by double-headed arrows in FIG. 3, are stored in respective registering locations of computer 11. After each bit time, e.g., $i+1$, the process will have been completed; the old $A_{i+1}$ and $B_{i+1}$ values are transferred to the $A_i$ and $B_i$ registers, respectively; and new A and B subinterval count values for the next bit time are overwritten in the $i+1$ registers.

A brief look at the wave diagram of FIG. 3 shows that for at least one type of corresponding subintervals of time-adjacent bit times, the subinterval counts should be of the same magnitude if the dotting sequence is present and regardless of phase error. Thus, it is desirable to select a numerical threshold and an arithmetic relationship which will provide, as a result of processing those subinterval counts, a bandpass filter characteristic which is preferably one having a high Q. In each subinterval of a pair in which neither straddles a signal transition, the counter 20 will attain maximum count (50 in the illustrative embodiment) magnitude in a direction, up or down, corresponding to the high or low data signal level of the respective subinterval. Consequently, the sum of those two counts will be zero, and their difference will be twice the maximum count magnitude.

The foregoing situation is utilized to advantage in the FIG. 4 process by calculating the difference between such corresponding subinterval count values and testing the difference magnitudes for both A and B subinterval types with respect to a threshold value $\epsilon$ to detect dotting. That value is selected to correspond approximately to what that count difference should be when dotting is present. A value of 99 has been found to produce satisfactory results for the illustrative embodiment in which each data bit period is sampled 100 times. Smaller values of $\epsilon$ represent further relaxation of the constraint against noise.

A dotting counter facility is provided in computer 11 to accumulate the number of bit times in which the process detects the presence of dotting. If a subinterval count difference magnitude less than $\epsilon$ is detected, the dotting counter content is tested, and if greater than zero, the dotting counter is decremented by one step. The process then loops back to a beginning point X1 following initialization in FIG. 4. If the dotting counter content were zero, the process loops directly to X1. If a subinterval count difference magnitude is found to be greater than or equal to $\epsilon$, the dotting counter is incremented; and then its contents are tested to determine whether or not they equal a predetermined value $\delta$. A value $\delta = 37$ has been empirically determined for the illustrative embodiment to indicate that a sufficient part of the 100-bit preamble has been detected so that it can be assumed that a full message preamble is present. Different minimum values for $\delta$ must be determined for each system depending upon the size of the data message preamble, the maximum noise and distortion usually included in received signals, and the message error rate which is acceptable in the system. If the contents of the dotting counter do not equal 37, the process loops back to X1 in FIG. 4. If the contents equal 37, the process continues into a phase acquisition sequence.

During phase acquisition, it is necessary first to determine the amount of phase error between the received data message preamble bits and the output of the reference clock 12, and then to adjust the bit clock delay offered by shift register 37 in FIG. 2. A review of FIG. 3 shows that subinterval counts of time-adjacent subintervals, e.g., $A_i$ and $B_i$, can reveal the extent of phase error. If there is zero phase error, each such count will be at the full count level of 50; and the two count values will be of opposite sign. If an error of 180 degrees is present, the time-adjacent A and B counts will also be at the maximum level; but they will be of the same polarity.

FIGS. 6 and 7 illustrate one way to utilize the foregoing subinterval count relationships for phase acquisition, assuming that they are determined in a dotting sequence as has been ascertained in the prior portions of the FIG. 4 process. FIGS. 6 and 7 contain plots of sums (dashed lines) and differences (solid lines) of time-adjacent subinterval counts plotted against phase error $\phi$ for the two possible types of three-bit data sequences that can be experienced in a dotting sequence. Positive and negative phase error in the FIGS. 6 and 7 refer to the bit rate clock lagging and leading, respectively, the data time base. One sequence is the binary 010 in FIG. 6, and the other is the 101 in FIG. 7. In each case, the $A_i$ and $B_i$ values indicated in the drawing are considered to be those of the central one of the three bits in the corresponding bit sequence.

Figure 10:
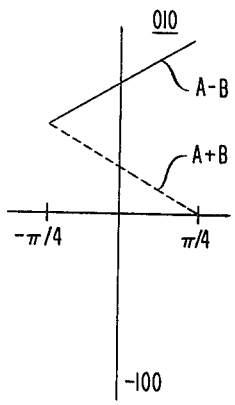

It is apparent that for the FIG. 6 010 sequence, the count difference has a maximum value of 100 at the zero phase error point, and has a minimum value of zero at the maximum 180-degree phase error condition. On the other hand, in the same figure, the count sum is a straight line passing through the origin and having negative slope. The FIG. 7 situation for the 101 case is the mirror image of that in FIG. 6 so that the difference values are all negative, and the sum line has a positive slope.

In order to find the magnitude of the phase error for any given dotting case, it is simply necessary to locate the sum and difference values on the respective characteristics. Nore that positive difference values signify the 010 situation; and negative difference values signify the 101 situation. The two values for the given bit situation should lie on a common vertical line which intersects the horizontal axis at a point corresponding to the magnitude of the phase error in degrees.

In the illustrative embodiment where each bit is sampled 100 times, the phase error resolution is 3.6 degrees, and the phase error magnitude is represented as:

$$\phi = \tfrac{1}{2}(A_i + B_i) \cdot 3.6.$$

Knowing the characteristics of the shift register 37, i.e., that it can include up to 128 selectable stages and is clocked at 100 times the bit rate, a translation table is advantageously constructed for converting the various possible combinations of subinterval sum and difference values into corresponding numbers of stages in the shift register 37. Since register 37 is illustratively clocked at a 1-MHz rate, each stage causes a delay of 1 microsecond, or 3.6 degrees in the 10-kilobit-per-second clock signal that is being sampled at the 1-MHz rate.

After detecting the presence of the dotting preamble as hereinbefore outlined in connection with FIG. 4, clock phase is acquired by first calculating the sum $A_i + B_i$ and the difference $A_i - B_i$ for the next bit interval. Those values are then translated in computer 11 into corresponding numbers of shift register delay stages, and the shift register is correspondingly altered as described in connection with FIG. 2. However, in so doing, the amount of translated phase change is advantageously offset by about a 45-degree advance in the phase of the bit rate clock for a reason which will be subsequently described. Since register 37 is illustratively initialized at zero delay, a net advance in clock phase is achieved by inserting a complementary, with respect to 360 degrees, number of phase delay stages. Thus, if a 10.8-degree (three stages) delay is needed to acquire phase, the net value with offset is $10.8 - 45 = -34.2$ degrees. Since that is a phase advance, the complementary delay is 325.8 degrees and is implemented by setting register 37 for 91, i.e., $325.8 \div 3.6 = 90.5$, stages of delay. The process then advances to the X2 portion thereof illustrated in FIG. 5.

In FIG. 5, the process initially assumes the continuation of the dotting preamble and tracks data bit-types and phase while checking for the word synchronizing Barker character. For this purpose, the process initially awaits the availability of the next pair of A and B subinterval counts. These counts are then processed in different ways for tracking data and phase. At the outset, the subinterval count sum and difference are calculated as previously described in connection with the clock phase acquisition step of FIG. 4.

For purposes of data tracking, a further review of FIG. 3 shows that when phase error is small, the time-adjacent subinterval counts for intervals $A_i$ and $B_i$ have values of opposite sign with respect to one another, but different signs individually for the different binary information states of the bit. Thus, for a binary ONE, represented by a negative-going transition, the count for $A_i$ is positive, and the count for $B_i$ is negative. For binary ZERO, represented by a positive-going transition, the $A_i$ count is negative, and the $B_i$ count is positive. Polarities of the indicated subinterval counts will necessarily reverse for large phase errors, i.e., greater than 90 degrees. A consequent information ambiguity is advantageously avoided herein by calculating the difference between the subinterval counts and testing that difference with respect to a threshold value of zero in order to discriminate between binary ONE and ZERO states. (Since it will be later assumed for the illustrative embodiment that the phase error after phase acquisition is always less than or equal to 45 degrees, the present information test can alternatively be conducted by testing either the A or the B value alone against zero in order to determine binary signal state.) If the difference $A - B$ is not greater than zero, it is decided that a binary ZERO bit was received, and such a bit is then supplied at the output of computer 11. Similarly, if the difference $A - B$ is equal to or greater than zero, a binary ONE signal is provided at the output.

Next, and still with respect to the same bit interval data, the process moves into a phase-tracking sequence. It can be shown, and those skilled in the art will appreciate that, in the type of diagram shown in FIGS. 6 and 7, phase error ambiguities can arise in some of the eight possible, three-bit, information sequences in a binary coded signal wave. For example, it can be shown that in an all-ZERO sequence, the $A + B$ sum is zero for all error magnitudes, and there can be either a positive or a negative phase error value for any value of the difference $A - B$, except the maximum negative value of that difference. It has been found that by employing the aforementioned phase advance offset of the local reference clock by 45 degrees, and an assumption that there will be no phase error greater than 45 degrees after dotting preamble detection and phase acquisition, the phase ambiguity problem is eliminated. This freedom from ambiguity is illustrated in the plots of FIGS. 8-15 of the sum and difference values vs. phase error for each of the mentioned eight cases. As in the diagrams of FIGS. 6 and 7, the indicated values of A and B are those for the central one of the bits in the three-bit sequence shown for each figure.

As previously noted, the maximum subinterval count magnitude in the illustrative embodiment is 50, and it can be seen in FIGS. 8-15 that such value is also related to a convenient threshold for discriminating between leading and lagging phase error conditions. That is, the difference between the sum and difference values change from zero at $-\pi/4$ error, through 50 at zero error, to 100 at $+\pi/4$ error. The value 50 is applied in a difference arithmetic relationship between the subinterval count difference and sum values already calculated for the bit interval in the early portion of the process shown in FIG. 5. Accordingly, if the following relationship is satisfied, $$|(A-B)-(A+B)| > 50,$$

the phase error is positive (the data leads the reference clock), and clock delay must be reduced by removing at least one stage of delay from shift register 37. Similarly, satisfaction of the following relationship:

$$|(A-B)-(A+B)| < 50$$

means that the phase error is negative, and clock delay must be increased in order to reduce the phase error. Likewise, satisfaction of the following relationship:

$$|(A-B)-(A+B)| = 50$$

means that the phase error is zero, and no shift register adjustment is required.

Hunting about the zero phase error condition is advantageously reduced by using a type of averaging function in order to assure that minor phase perturbations do not cause changes in the state of the shift register 37. This function is conveniently achieved in the illustrative embodiment by requiring the accumulation in a phase counter in computer 11 of the number of times that a phase correction is indicated. This count is tested, and if it increases to a level of 4 or decreases to a level of $-3$, a phase correction is actually effected. In implementing the above averaging function for computer 11, it is noted that the expression for the magnitude difference between subinterval count difference and sum values reduces algebraically to a consideration of the $|B|$ with respect to a threshold value of 25. That $|B|$ is, of course, already present in one of the computer port registers.

In the process illustrated in FIG. 5, the $|B|$ is first tested to determine whether or not it equals 25. If yes, no phase change is required, and the process jumps to a test of the most recently detected eleven data bits outputted by computer 11 to determine whether or not they constitute the Barker word synchronizing character. If the Barker character is present, a flag is set in computer 11, and communicated therefrom to enable equipment (not shown) for utilization of the data information thereafter regenerated by the circuits of FIG. 1. Whether or not the Barker word is detected, the process then tests for end of message (EOM). If the message has not ended, the process loops back to X2 to await the next pair of subinterval counts of the next data bit. However, if the message has ended, the Barker flag is reset, and the process loops back to X1 in FIG. 4 to await subinterval counts for the next bit clock interval to resume recurrent testing for a dotting preamble.

Returning in FIG. 5 to the first $|B|$ test, if the magnitude does not equal 25, it is then tested to determine whether or not it is less than 25. If yes, the aforementioned phase counter is incremented; and if not, the counter is decremented. Thereafter, the phase counter content is tested to determine whether or not it has attained a level of 4. If yes, the delay in shift register 37 is increased by one step, i.e., one stage; if not, the phase counter content is again tested to determine whether or not it is equal to $-3$. If not, the process jumps to the Barker synchronizing word test. If yes, the phase delay in shift register 37 is decreased by one step, and then the process advances to the Barker word test. The phase counter function just outlined averages phase change effects, and the $+4$ and $-3$ bounds employed illustratively are not critical.

Although the present invention has been described in connection with one particular embodiment thereof, it is to be understood that additional embodiments, modifications, and applications thereof, which will be obvious to those skilled in the art, are included within the spirit and scope of the invention.

I claim:

1. In a system for receiving binary coded data signals having at least one predetermined characteristic, as well as having at least one signal level transition per symbol in a direction that is indicative of the binary information state of the symbol, the method for detecting the state of said predetermined characteristic of such data signals CHARACTERIZED BY the steps of generating (10) binary coded words representing, respectively, for recurring symbol subintervals of predetermined length, the approximate proportion of each subinterval that the information signal state is in one of the binary signal states, and processing (11) said words to detect the state of said characteristic in said signals.

2. The data signal characteristic detecting method in accordance with claim 1 wherein the system is responsive to a local clock signal (12), and the method is further CHARACTERIZED IN THAT the word generating step includes the steps of sampling (17) said data signal at the rate of the local clock signal, which clock signal is at a higher rate than the data bit rate, and during each subinterval, reversibly counting (20) pulses in said local clock signal in a counting direction which is a function of the data signal information state of each data sample.

3. The data characteristic detecting method in accordance with claim 2 in which the method is further CHARACTERIZED BY deriving from said local clock signal a bit rate clock signal, and the inclusion in said processing step of the steps of calculating the sum and difference of time-adjacent subinterval count words, and adjusting the phase of said bit rate clock to a predetermined phase relationship with the received data signals.

4. The data signal characteristic detecting method in accordance with claim 3 and further CHARACTERIZED BY the inclusion in the processing step of the steps of establishing a symbol information state discriminating threshold value, comparing at least one subinterval count word per symbol to said threshold value, and outputting, in response to the results of the foregoing comparing step, a regenerated version of the data signal in synchronism with said local clock.

5. The data signal characteristic detecting method in accordance with claim 1 in which said characteristic is the leading or lagging phase state of a bit rate clock signal with respect to symbols of said data signals and CHARACTERIZED IN THAT said subinterval predetermined length is approximately one-half of a symbol interval in said data signals, and said processing step includes the steps of selecting a threshold value for said phase state, and testing a value proportional to the magnitude of one of said subinterval count words for one of said symbols with respect to said threshold value to indicate leading or lagging phase as a function of whether the value is larger or smaller than said threshold.

6. The data signal characteristic detecting method in accordance with claim 1 or 2 further CHARACTERIZED IN THAT the processing step includes the steps of selecting a threshold value and a count word combining rule for said characteristic, combining selected ones of said count words according to said rule, and comparing the result of said combining step to said threshold value to indicate the state of said characteristic in said signals.

7. The data signal characteristic detecting method in accordance with claim 6 in which said characteristic is the binary information state of successive symbols in said data signals, and the method is further CHARACTERIZED IN THAT said combining step includes the steps of calculating the difference between time-adjacent subinterval count word values, and said comparing step comprises the step of testing said difference with respect to an information threshold value such that the test result has a first binary state if the difference is greater than said threshold, and a second binary state if the difference is less than said threshold value.

8. The data signal characteristic detecting method in accordance with claim 6 in which said characteristic is the leading or lagging phase state of a bit rate clock signal with respect to symbols of said data signals, and the method is further CHARACTERIZED IN THAT said combining step includes the steps of, for each pair of time-adjacent subinterval count words, calculating the sum of and difference between the words of said pair, and calculating a further difference value of the first mentioned count word difference minus said count word sum, and said comparing step comprises the step of testing the magnitude of said further difference with respect to a predetermined phase state threshold value such that if said further difference is larger than said such threshold value, an advance-clock-phase signal is produced, and if said further difference is smaller than said such threshold, a retard-clock-phase signal is produced.

9. The data signal characteristic detecting method in accordance with claim 8 CHARACTERIZED IN THAT it includes the further steps of repeating said combining and comparing steps for successive symbols of said data signal, accumulating the number of said advance signals reduced by the number of said retard signals, testing the result of said accumulating step with respect to a predetermined range of values, and when said result is outside of said range, changing the phase of said bit rate clock by one predetermined delay unit in a direction indicated by the sign of said result.

10. The data signal characteristic detecting method in accordance with claim 6 in which said characteristic is the presence or absence state of a predetermined frequency component in said data signals, and said method is further CHARACTERIZED IN THAT said comparing step further includes the step of testing, as to successive pairs ($A_i$, $A_{i+1}$) of alternate ones of said words, the magnitude of the difference between the words of a pair with respect to the magnitude of a predetermined frequency threshold value chosen so that if said difference is at least equal to said value, said frequency component is present.

11. The data signal characteristic detecting method in accordance with claim 10 and further CHARACTERIZED IN THAT said testing step includes the steps of calculating the difference between subinterval count words of a pair occurring at the beginning of time-adjacent symbols in said data signals, calculating the difference between subinterval count words of a pair occurring at the end of said time-adjacent symbols, testing at least one of said calculated differences with respect to a said frequency threshold value, and if the tested difference is at least equal to said frequency threshold, producing a signal indicating the presence of said frequency component.

12. The data signal characteristic detecting method in accordance with claim 11 CHARACTERIZED IN THAT said comparing step further includes the steps of accumulating the number of occurrences of said component indicating a signal over a plurality of successive sets of time-adjacent symbols, and testing the result of said accumulating step for attainment of a value predetermined to signify a sequential symbol interval of predetermined minimum duration and including said frequency component.

13. The data signal characteristic detecting method in accordance with claim 11 in which said method is further CHARACTERIZED IN THAT during the next symbol interval following said time-adjacent symbols, said method includes the steps of calculating the sum and difference of time-adjacent subinterval count words thereof, translating the values of said sum and difference into a corresponding bit rate clock phase error value, and adjusting the phase of said bit rate clock substantially to eliminate said phase error value.

14. The data signal characteristic detecting method in accordance with claim 13 further CHARACTERIZED IN THAT said adjusting step includes the step of offsetting the phase adjustment value for said symbol rate clock by an amount which is sufficient in a predetermined phase error range to cause every sum and difference value combination to represent a unique phase error value in said range.

15. The data signal characteristic detecting method in accordance with claim 14 in which an additional characteristic is the binary information state of said data signals, and the method is further CHARACTERIZED IN THAT said processing step includes the steps of selecting one of said interval count words occurring in a symbol interval, testing said one word with respect to a predetermined information threshold value, and outputting a signal in a first binary state if said word is greater than said information threshold, and outputting a signal in a second binary state if said word is less than said information threshold.

16. In a system for receiving binary coded data signals having at least one predetermined characteristic as well as having at least one signal level transition per symbol in a direction that is indicative of the binary information state of the symbol, a circuit for detecting said characteristic and being CHARACTERIZED IN THAT it includes means for generating (10) binary coded words representing, respectively, for recurring symbol subintervals of predetermined length, the approximate proportion of each interval that the information signal state is in one of the binary signal states, and means for processing (11) successive ones of said words for detecting said data signal characteristic.

17. The characteristic detecting circuit in accordance with claim 16 in which such circuit is responsive to a local clock (12) signal and is CHARACTERIZED IN THAT said word generating means comprises
- means (17) for sampling said data signal at the rate of said local clock signal, which rate is higher than the symbol rate of said data signal, and
- means (20) for reversibly counting pulses in said lock clock signal during respective ones of said subintervals in a counting direction which is a function of the data signal information state of each sample.

18. The characteristic detecting circuit in accordance with claim 17 CHARACTERIZED IN THAT said processing means comprises
- means (11) for combining selectable sets of said subinterval count words in accordance with a predetermined logical rule for representing said predetermined characteristic of said data signals, and
- means for comparing combined count word results with respect to a predetermined threshold value for indicating the state of said characteristic.

19. The characteristic detecting circuit in accordance with claim 17 further CHARACTERIZED IN THAT there are provided
- means (13), responsive to an output of said processing means, for adjusting the phase of operation of said counting means.

* * * * *

UNITED STATES PATENT AND TRADEMARK OFFICE
CERTIFICATE OF CORRECTION

PATENT NO. : 4,330,862
DATED : May 18, 1982
INVENTOR(S) : Kenneth F. Smolik

It is certified that error appears in the above—identified patent and that said Letters Patent is hereby corrected as shown below:

Column 1, line 27, "shaft" should read --shift--. Column 3, line 36, "$\phi 1$" should read --$\emptyset 1$-- and "$\phi 2$" should read --$\emptyset 2$--; line 51, "Q" (second occurrence) should read --$\overline{Q}$--. Column 4, line 30, "datta" should read --data--; line 31, "Q" should read --$\overline{Q}$--; line 32, "$\phi 2$" should read --$\emptyset 2$-- and "$\phi 1$" should read --$\emptyset 1$--; line 39 "$\phi 2$" should read --$\emptyset 2$--; line 42, "$\phi 1$" should read --$\emptyset 1$--. Column 5, line 26, "CS" should read --$\overline{CS}$--; line 30, "RD" should read --$\overline{RD}$--; line 31, "WR" should read --$\overline{WR}$--. Column 6, line 32, "$(1/f_c)$" should read --$1/f_c$--. Column 7, line 38, "$\phi 1$" should read --$\emptyset 1$--. Column 9, line 8, "Nore" should read --Note--. Column 15, line 8, "lock" should read --local--.

Signed and Sealed this

Second Day of November 1982

|SEAL|

Attest:

GERALD J. MOSSINGHOFF

Attesting Officer    Commissioner of Patents and Trademarks